US 8,358,889 B2
Jan. 22, 2013

(12) United States Patent
Barsan et al.

(54) DEVICE FABRICATION WITH PLANAR BRAGG GRATINGS SUPPRESSING PARASITIC EFFECTS

(75) Inventors: Radu Barsan, Saratoga, CA (US); Lew Stolpner, Mt. View, CA (US)

(73) Assignee: Redfern Integrated Optics, Santa Clara, CA (US)

( * ) Notice: Subject to any disclaimer, the term of this patent is extended or adjusted under 35 U.S.C. 154(b) by 310 days.

(21) Appl. No.: 12/787,652

(22) Filed: May 26, 2010

(65) Prior Publication Data
US 2010/0303411 A1  Dec. 2, 2010

Related U.S. Application Data

(60) Provisional application No. 61/181,617, filed on May 27, 2009.

(51) Int. Cl.
*G02B 6/34* (2006.01)
(52) U.S. Cl. ............... 385/37; 385/14; 385/15; 385/31; 385/129; 385/130
(58) Field of Classification Search .............. 385/14, 385/15, 31, 37, 129, 130, 141, 144
See application file for complete search history.

(56) References Cited

U.S. PATENT DOCUMENTS

| | | | |
|---|---|---|---|
| 4,248,614 A | 2/1981 | Scherer | |
| 5,679,291 A | 10/1997 | Hakogi | |
| 6,428,944 B1 * | 8/2002 | Alibert et al. | 430/321 |
| 6,545,808 B1 | 4/2003 | Ehbets et al. | |
| 6,885,414 B1 | 4/2005 | Li | |
| 6,946,238 B2 | 9/2005 | Zhang et al. | |
| 7,190,858 B1 | 3/2007 | Greiner et al. | |
| 2005/0141808 A1 | 6/2005 | Cheben et al. | |

OTHER PUBLICATIONS

International Search Report issued for PCT/US2010/036152 on Sep. 2, 2010.

* cited by examiner

*Primary Examiner* — Jennifer Doan
(74) *Attorney, Agent, or Firm* — David H. Jaffer; Pillsbury Winthrop Shaw Pittman LLP

(57) ABSTRACT

The present invention relates to various methods of fabricating Planar Bragg Gratings (PBG) in a doped waveguide in a Planar Lightwave Circuit (PLC) device, suppressing unwanted parasitic grating effects during fabrication of the device. One approach to reduce parasitic gratings is to use a hard mask before the waveguide photolithography and etch, that results in a steeper sidewall angle that reduces or eliminates the parasitic grating effect. Another method of reducing parasitic grating effect is to deposit a layer of developable Bottom Anti Reflective Coating (BARC) prior to depositing the photo resist for waveguide etch. A third method of resisting parasitic gratings comprises using a planarizing undoped silica layer as a barrier layer on top of the core. During subsequent high temperature annealing germanium outdiffuses laterally into the cladding. The net effect is an optical waveguide with improved lateral uniformity because germanium diffusion smoothes out the sidewall roughness created during the waveguide reactive ion etch process. The undoped silica (SiO2) layer on top of the grating also serves the purpose of significantly reducing germanium outdiffusion from the core in the upward direction.

16 Claims, 8 Drawing Sheets

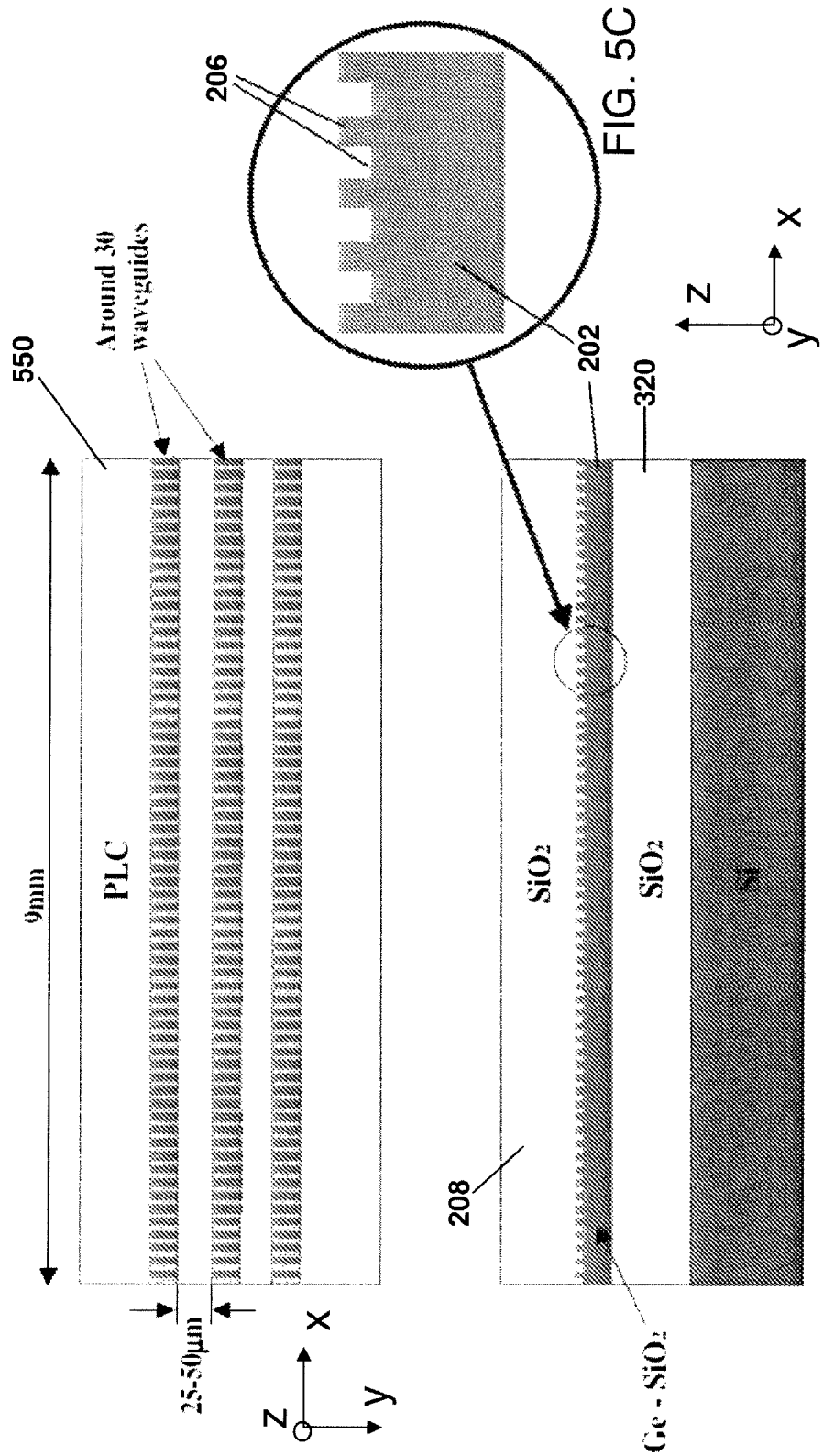

DEVICE FABRICATION WITH PLANAR BRAGG GRATINGS SUPPRESSING PARASITIC EFFECTS

CROSS REFERENCE TO RELATED APPLICATION

This application claims priority from U.S. Provisional Application Ser. No. 61/181,617 filed May 27, 2009.

FIELD OF THE INVENTION

The present invention relates to methods of fabricating Planar Bragg Gratings (PBG) in a doped waveguide in a Planar Lightwave Circuit (PLC) device.

BACKGROUND

Bragg gratings have a number of important applications in optical components, such as, lasers, sensors, dispersion compensation devices, etc. There are many ways to manufacture Bragg gratings on an optical fiber or in a planar waveguide. A Bragg grating comprises a number of partially reflecting elements imprinted or embedded onto the light guiding element (e.g., optical fiber or optical waveguide). While the manufacturing of Bragg gratings by using holographic exposure of optical fiber has been well established, the manufacturing of Bragg grating in planar waveguides has encountered a number of challenges, including unwanted parasitic gratings, as will be described further below.

Implementation of Bragg gratings in planar waveguides, known as planar Bragg gratings or PBG, has multiple advantages for monolithic as well as hybrid integration with other devices. Examples include monolithic integration of PBG with light amplification devices within a PLC device, rare-earth-doped waveguide lasers, etc. PBG can also be integrated with active components that are flip-chip mounted on the PLC device or otherwise coupled to the PLC device, for example, to form external cavity lasers (ECL) on a PLC platform.

The standard fabrication of PBG may use a silica-on-silicon optical bilayer as a PLC platform. In this process, first a buffer silica layer is deposited on a silicon wafer, followed by the deposition of a germanium-doped silica layer, which is called the 'core' layer. In case of PBG, grating element formation step is integrated into the waveguide formation process. In case of PLC, these grating elements are implemented by locally changing the index of refraction and/or geometry of the waveguide via holographic UV exposure of the germanium-doped silica core layer. The period of the grating structure defines the central wavelength of the resulting Bragg grating. For example, for a 1550 nm wavelength, the physical period of the Bragg grating corrugations is approximately 0.5 micron, i.e. each trench and each raised feature of the Bragg grating is approximately 0.25 micron. These features can be produced by means of an additional photolithographic and grating etch step on the germanium-doped core layer before etching the entire waveguide. After the PBG is defined, the waveguide itself is defined by means of another photoresist-based lithography step and an etch step (using reactive ion etching or RIE process or other etching processes). Waveguide sidewalls are exposed in this etching step. The process is completed by depositing a final layer of silica, i.e., the 'cladding' layer that encompasses the core layer.

During the process of etching the waveguide after the Bragg grating corrugations have been defined in the core layer, an out-of-phase "parasitic" grating is formed on the sidewalls of the waveguide, as shown in FIG. 1. FIG. 1 is a scanning electron microscope (SEM) picture, showing the top view of an etched waveguide before the cladding layer is deposited. As shown in FIG. 1, the individual grating corrugations are about 240 nm, and a physical period of the corrugation is about 540 nm. These parasitic features on the sidewalls are 180 degrees out-of-phase with the primary desired Bragg grating corrugations at the top of the waveguide. It is believed that the cause of the formation of the parasitic gratings is an interaction of the reactive ion etching reactants with the non-uniform photo resist layer used to mask the corrugated wave guide during waveguide etch. Note that the photoresist is not applied on a planar substrate, as the top surface of the core layer is already corrugated due to the presence of the PBG. The photoresist layer has a variable thickness due to the corrugated substrate it is applied on. SEM analysis revealed that the parasitic gratings are structures that may have a surface area approximately double that of the surface area of the primary gratings. Characteristics (e.g., depth, duty cycle, surface roughness etc.) of the parasitic gratings are largely uncontrollable. The out-of-phase parasitic grating has the effect of weakening or canceling out altogether the reflectance of the primary grating etched at the top of the waveguide, leading to uncontrolled optical performance of the Bragg grating, and the PLC device.

In addition to the problem of sidewall parasitic grating affecting the primary grating performance, a related problem observed during the fabrication of PBGs is outdiffusion of dopant from the core area to adjacent cladding or buffer materials during high-temperature (e.g., 800-100° C. or higher temperature) annealing. In case of germanium-doped silica core, the outdiffusion problem is particularly prominent, because at high annealing temperature, germanium can diffuse to distances on the order of 1 micron or more depending on the cladding material, which may result in erasure of refractive index variation created by the etched grating corrugations, if the outdiffusion is not prevented in certain directions.

Therefore, what is needed is methods of suppressing the formation of and detrimental effects of undesirable parasitic gratings on waveguide sidewalls in a PLC device with integrated Bragg gratings. In addition, it is desirable that the methods also address the problem of dopant outdiffusion from the core area of the waveguide in certain directions that negatively affects primary grating performance.

SUMMARY OF THE INVENTION

The present invention relates to various methods of fabricating Planar Bragg Gratings (PBG) in a doped waveguide in a Planar Lightwave Circuit (PLC) device, suppressing unwanted parasitic grating effects during fabrication of the device.

According to one aspect, the present invention discloses a method for fabricating a planar lightwave circuit (PLC) device, the method comprising: selectively doping an area of a core layer with a dopant to define a core area of a waveguide; preparing Bragg grating corrugations on top of the core area across a predefined width of the waveguide; forming a barrier layer on top of the Bragg grating corrugations, wherein a material of the barrier layer is selected to prevent outdiffusion of the dopant into the barrier layer; lithographically patterning a top surface of the PLC device to cover the Bragg grating corrugations underneath during subsequent etching; etching through the barrier layer and through the core layer to expose waveguide sidewalls; encompassing the core area at least partially with a cladding material; and annealing the PLC device at a high temperature, allowing outdiffusion of the dopant from the core area into the cladding material, thereby smoothening the waveguide sidewalls.

In furtherance of these and other aspects, a planar lightwave circuit (PLC) device is disclosed, comprising: a core area of a waveguide doped with a dopant, wherein the core area is at least partially encompassed with a cladding material; Bragg grating corrugations on top of the core area across a predefined width of the waveguide; and a barrier layer on top of the Bragg grating corrugations, wherein a material of the barrier layer is selected to prevent outdiffusion of the dopant into the barrier layer; wherein when the PLC device is annealed at a high temperature, allowing outdiffusion of the dopant from the core area into the cladding material, waveguide sidewalls are smoothened, avoiding parasitic gratings on the waveguide sidewalls.

According to another aspect, the present invention discloses a method for fabricating a planar lightwave circuit (PLC) device, the method comprising: defining a core area in a core layer of a waveguide; preparing Bragg grating corrugations on top of the core area across a predefined width of the waveguide; forming a Bottom Anti Reflective Coating (BARC) layer on top of the Bragg grating corrugations, wherein the BARC layer substantially planarizes the Bragg gating corrugations; hard-baking the BARC layer, where parameters of the hard-baking step are controlled to tailor an undercut of a photoresist layer at an interface with the BARC layer during subsequent photolithography; photolithographically patterning a top surface of the PLC device to cover the Bragg grating corrugations with the photoresist layer and the BARC layer during subsequent etching; etching through the core layer to expose waveguide sidewalls, wherein undesired parasitic gratings are prevented from being formed during the etching step due to the undercut of the photoresist layer at the interface with the BARC layer.

According to yet another aspect, the present invention discloses a method for fabricating a planar lightwave circuit (PLC) device, the method comprising: defining a buffer layer; preparing an Bragg grating corrugations on top of the buffer layer across a predefined width of a waveguide; depositing a core layer on top of the buffer layer to embed the Bragg grating corrugations; lithographically patterning the core layer to cover the predefined width of the waveguide with the embedded Bragg grating corrugations; and etching through the core layer to expose waveguide sidewalls, wherein undesired parasitic gratings are prevented from being formed during the etching step due to the embedding of the Bragg grating corrugations.

The invention itself, together with further objects and advantages, can be better understood by reference to the following detailed description and the accompanying drawings.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 5A-C schematically illustrate an alternate embodiment of the present invention with multiple waveguides.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

As discussed above, the present invention discloses different approaches for eliminating the formation and effects of parasitic gratings, as well as eliminating other parasitic effects arising out of dopant outdiffusion from the core area of the waveguide.

One approach to reduce parasitic gratings is to use a hard mask process, where a polysilicon, metal or other suitable other material is deposited and optionally patterned as a hard mask to cover the etched primary gratings on top of the core layer before the waveguide etch step. The hard mask reduces or eliminates the possible interaction between RIE reactants and photoresist directly at the PBG interface. This interaction is believed to be a contributor in the formation of the parasitic gratings. Etching using a hard mask results in a steeper sidewall angle that reduces or eliminates the parasitic grating effect. The hard mask layer can also be referred to as a barrier layer. Usually, the barrier layer material is chosen such that the dopant outdiffusion from the core towards the barrier layer is very limited compared to other possible directions of outdiffusion due to subsequent high temperature annealing.

Figure 1:
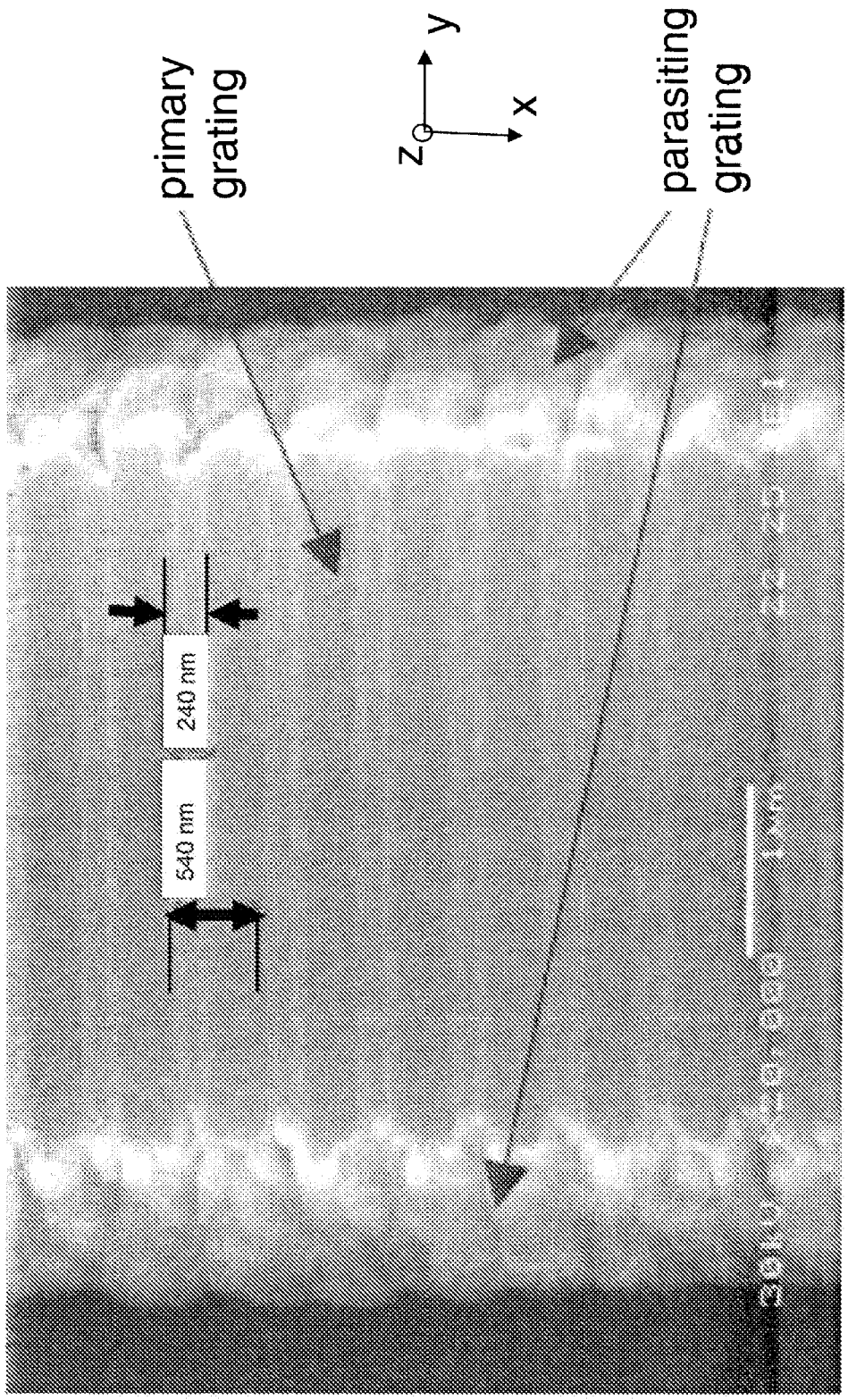
FIG. 1 is a SEM picture showing the top view of a PLC device with primary gratings on top of the waveguide and parasitic gratings on the sidewalls on both sides of the waveguide.
Figure 2:
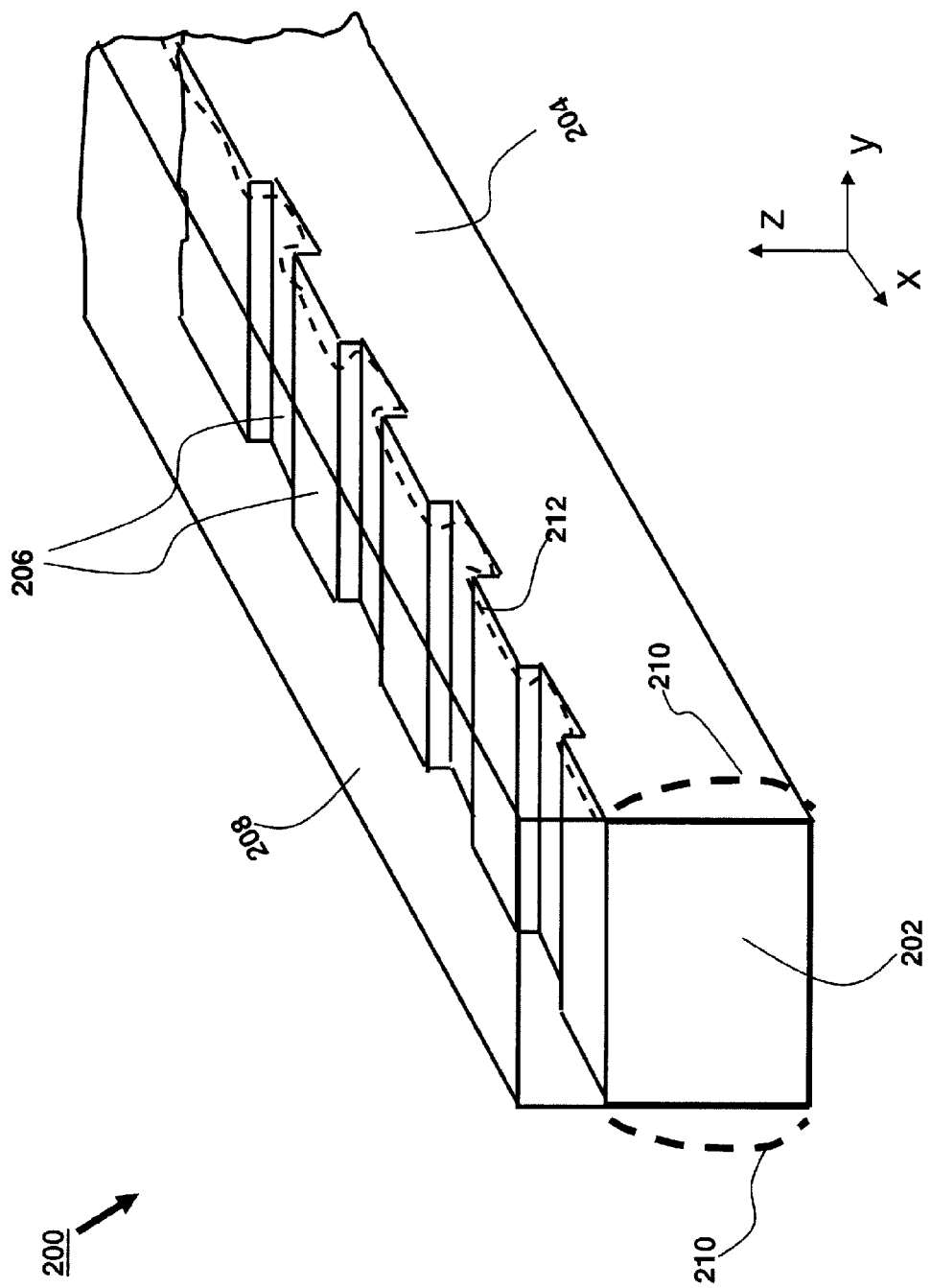
FIG. 2 is an exemplary schematic diagram of a waveguide with PBG, according to an exemplary embodiment of the present invention.

Another method of resisting the formation of sidewall parasitic gratings comprises using a barrier layer that acts as a planarizing layer on top of the PBG corrugations. FIG. 2 shows a schematic of an etched waveguide structure 200 having a core layer 202 with PBG corrugations 206 defined on top out. Layer 208 is a planarizing barrier layer. The material of the barrier layer 208 should be such that dopant outdiffusion towards the barrier layer at high temperature is kept to a minimum level compared to lateral outdiffusion of the dopant. The core layer 202 may be deposited on top of a buffer layer 320, that is not shown in FIG. 2, but shown in subsequent FIGS. 3, 5 and 6. Also not shown in FIG. 2 is a cladding layer 314 that eventually partially or fully surrounds the etched core layer 202 and the barrier layer 208.

In one example embodiment of waveguide 200, the core layer 202 comprises germanium-doped silica, and the barrier layer 208 comprises undoped silica. The cladding layer may be borophosphosilicate glass (BPSG). The buffer layer may comprise BPSG or silica. Persons skilled in the art will understand, in view of the present discussion, that the invention is not limited by these illustrative materials, as along as the properties of the materials achieve the desired functionality of the device.

A typical thickness of the barrier layer may be in the order of 1 micron or more, while a typical grating corrugation depth is in the order of 200 nm. Therefore, the barrier layer substantially planarizes the device avoiding formation of undesirable 'keyholes' or voids over the narrow corrugations of the Bragg grating.

During waveguide etching, RIE or other etching processes etches through the barrier layer 208 and the core layer 202. The barrier layer 208 may also be pre-patterned to act as hard mask during waveguide core layer 202 etching. Parasitic gratings (not specifically shown in FIG. 2) may be formed on the exposed sidewalls 204 of the waveguide. However, due to the planarization effect of the barrier layer 208, the parasitic effect is significantly reduced. The parasitic effects are further reduced during the subsequent processing, including the high-temperature annealing process, as will be explained below.

Figure 3B:
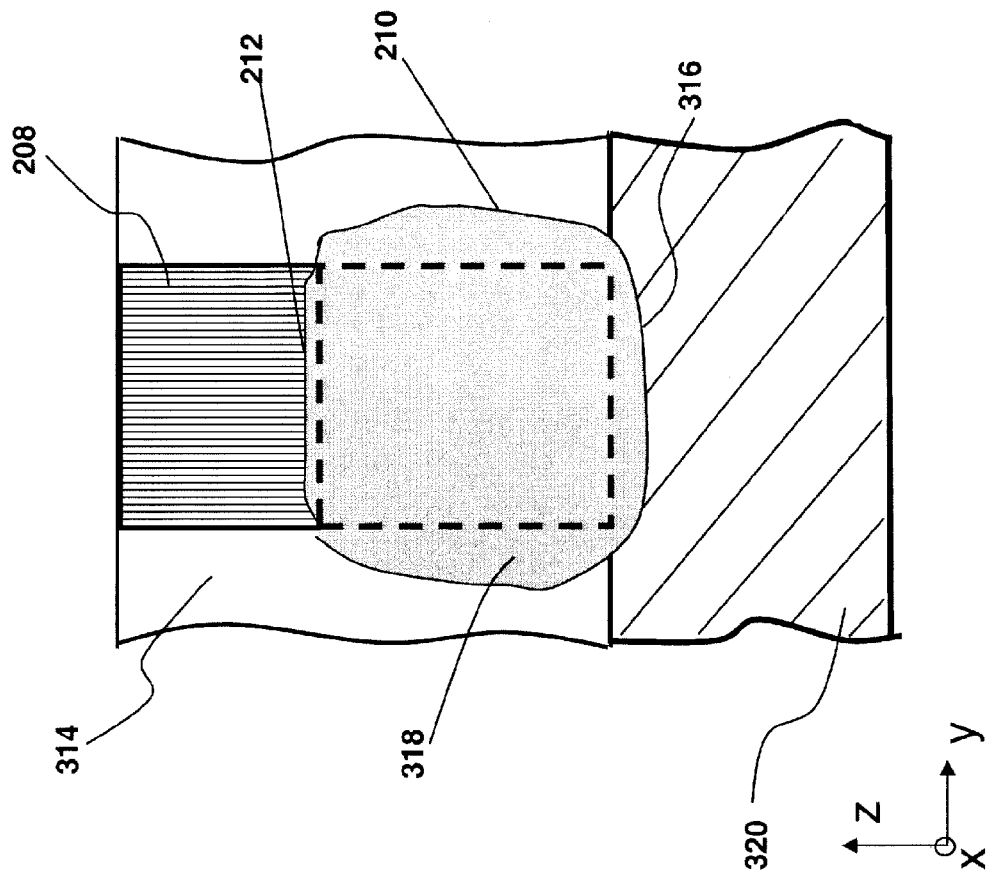
FIGS. 3A and 3B schematically illustrate dopant distribution before and after high-temperature annealing, respectively, according to an embodiment of the present invention.
Figure 3A:
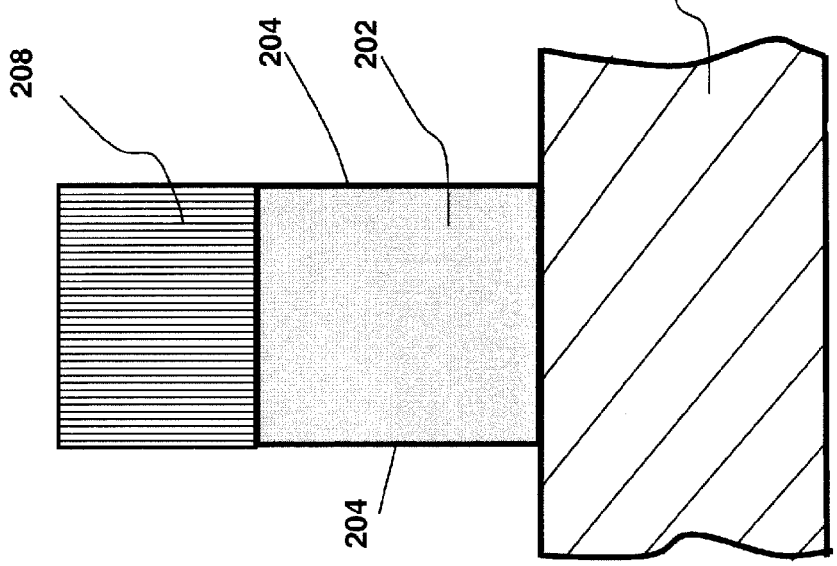

FIG. 3A shows a schematic front view of the etched waveguide with exposed sidewalls 204. Once the waveguide is etched, cladding material 314 is deposited without covering or passivating the exposed sidewalls 204, as shown in FIG. 3B. FIG. 3B also shows outdiffusion of the dopant into the cladding layer 314, into the buffer layer 320, and somewhat into the barrier layer 208, during the high-temperature annealing. The contour 318 represents the changed dopant distribution of the rectangular core 202 after the dopant outdiffusion during annealing. As discussed before, the outdiffusion 212 (also shown in FIG. 2 by the dotted line conformal to the grating corrugations) into the barrier layer 208 is minimum, but lateral outdiffusion 210 (also shown in FIG. 2 by the bulging dotted lines on both sides of the core 202) into the cladding layer 314 is quite significant. This lateral outdiffusion of dopant from core 202 to cladding 314 is used to the device's performance advantage, as it counters the effect of the parasitic gratings formed at the interface of the core 202 and the cladding 314 in the lateral direction. Due to the outdiffusion of dopant, sidewalls are smoothened, and characteristics of the parasitic gratings are modified to a degree where they do not adversely affect the primary grating characteristics anymore.

Outdiffusion 316 into the buffer layer may or may not happen, depending on the material of the core 202 and the buffer layer 320. In general, the downward outdiffusion 316 is less important in terms of nullifying the sidewall parasitic gratings' effects.

Prevention of upward outdiffusion of dopant by properly choosing a barrier layer of suitable material and of suitable thickness is a novelty offered by the present invention, as keeping the upward outdiffusion 212 to a bare minimum ensures one of the ways of preservation of primary grating characteristics in addition to sidewall smoothening.

The net effect of the present method of depositing a barrier layer and allowing lateral dopant outdiffusion is achieving an optical waveguide with improved lateral uniformity. Thus the process claimed in this disclosure solves the challenges of fabricating Bragg gratings in doped waveguides used in a PLC.

Figure 4:
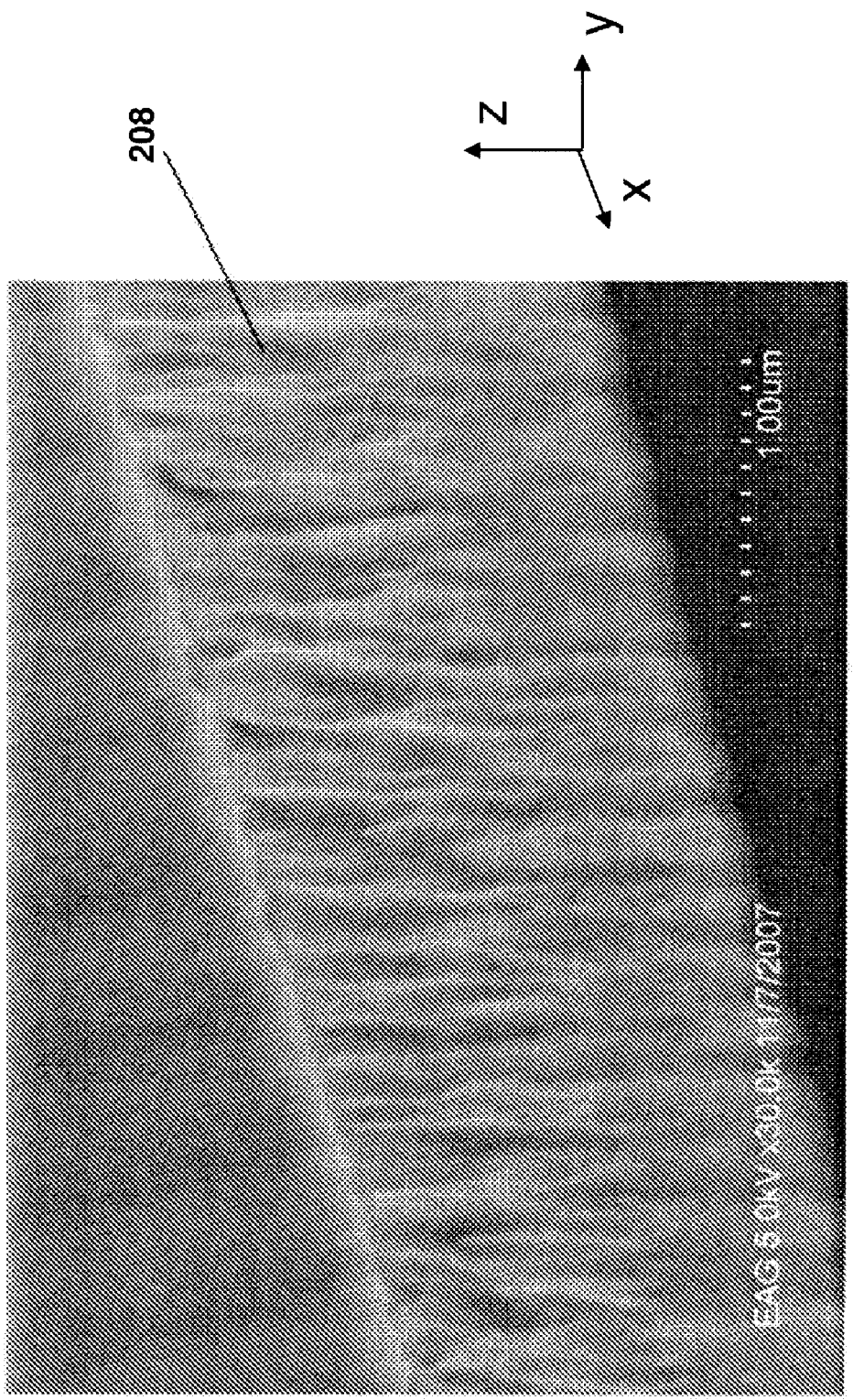
FIG. 4 is a SEM picture showing the barrier layer on top of a PBG, according to an embodiment of the present invention.

FIG. 4 shows a SEM of an etched undoped silica barrier layer 208 creating a planarizing effect by evening out the grating corrugations substantially in one example embodiment of the present invention. The thickness of the barrier layer in this example is about 1 micron. The sidewall roughness of the barrier layer seen in the SEM picture is not known to have a perceptible effect on the waveguide PBG performance.

FIG. 5A shows a top view of an example PLC 550, where instead of one waveguide, multiple waveguides are disposed side by side as an array. In the particular example shown in FIG. 5A, around 30 waveguides are included in an array, the separation between them being 25-50 micron. The total length of the PLC may be about 9 mm. These dimensions are for illustrative purposes only, and are not limiting to the scope of the invention. Each waveguide may have slightly different PBG characteristics or waveguide dimensions to offer flexibility in wavelength selection. This may be an useful feature, for example, in multi-channel sensing or communication applications, such as Dense Wavelength Division Multiplexing (DWDM). Alternatively, having multiple waveguides, each having a characteristic wavelength, offers the flexibility of wavelength tuning, and can offset manufacturing variability, as may be required, for example, in narrow linewidth ECL applications.

FIG. 5B shows a side view of the PLC 550 built on a silica-on-silicon optical bilayer PLC platform. In this particular example, the buffer layer 320 is silica, the core layer 202 is Ge-doped silica, and the barrier layer 208 is undoped silica. FIG. 5C shows a magnified view of the grating corrugations 206.

Figure 6A:
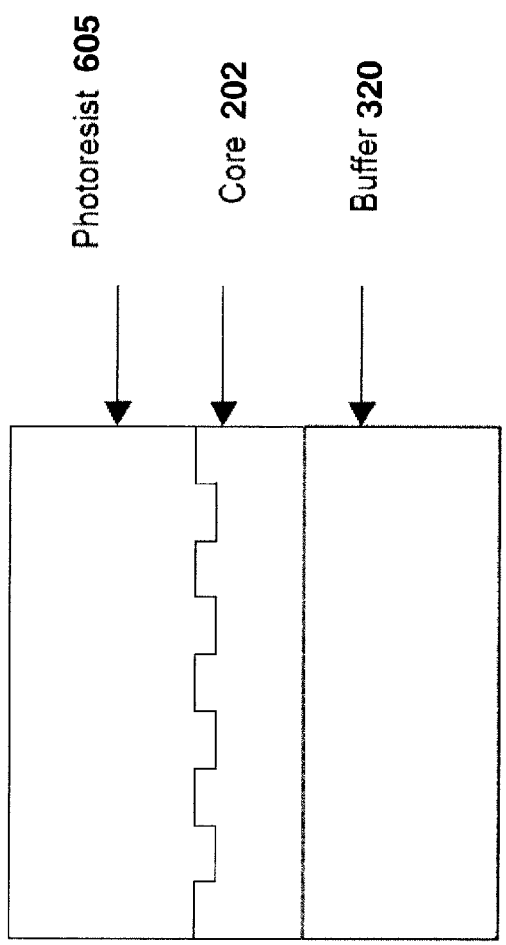
FIGS. 6A-B schematically depict an example method of the present invention that uses a Bottom Anti Reflective Coating (BARC) layer to reduce the chances of formation of parasitic grating.
Figure 6B:
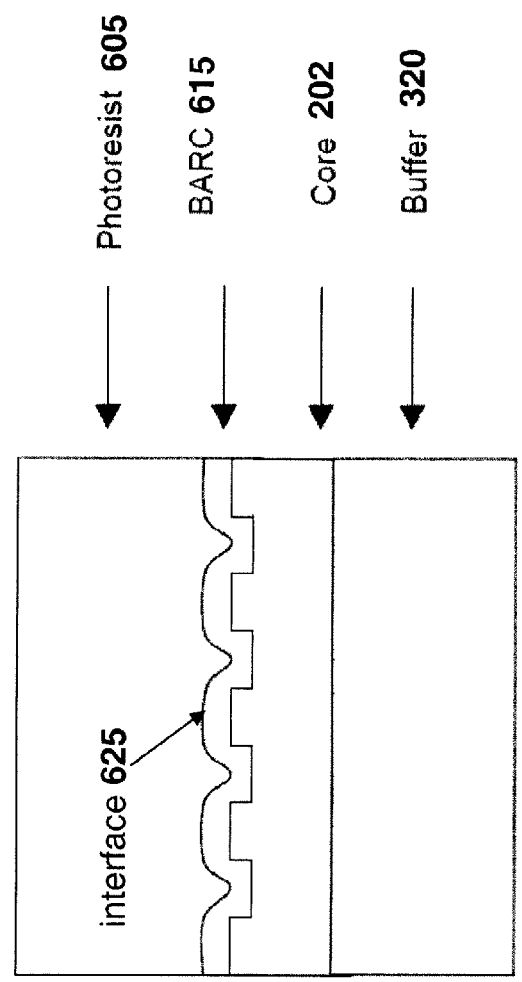
Figure 7:
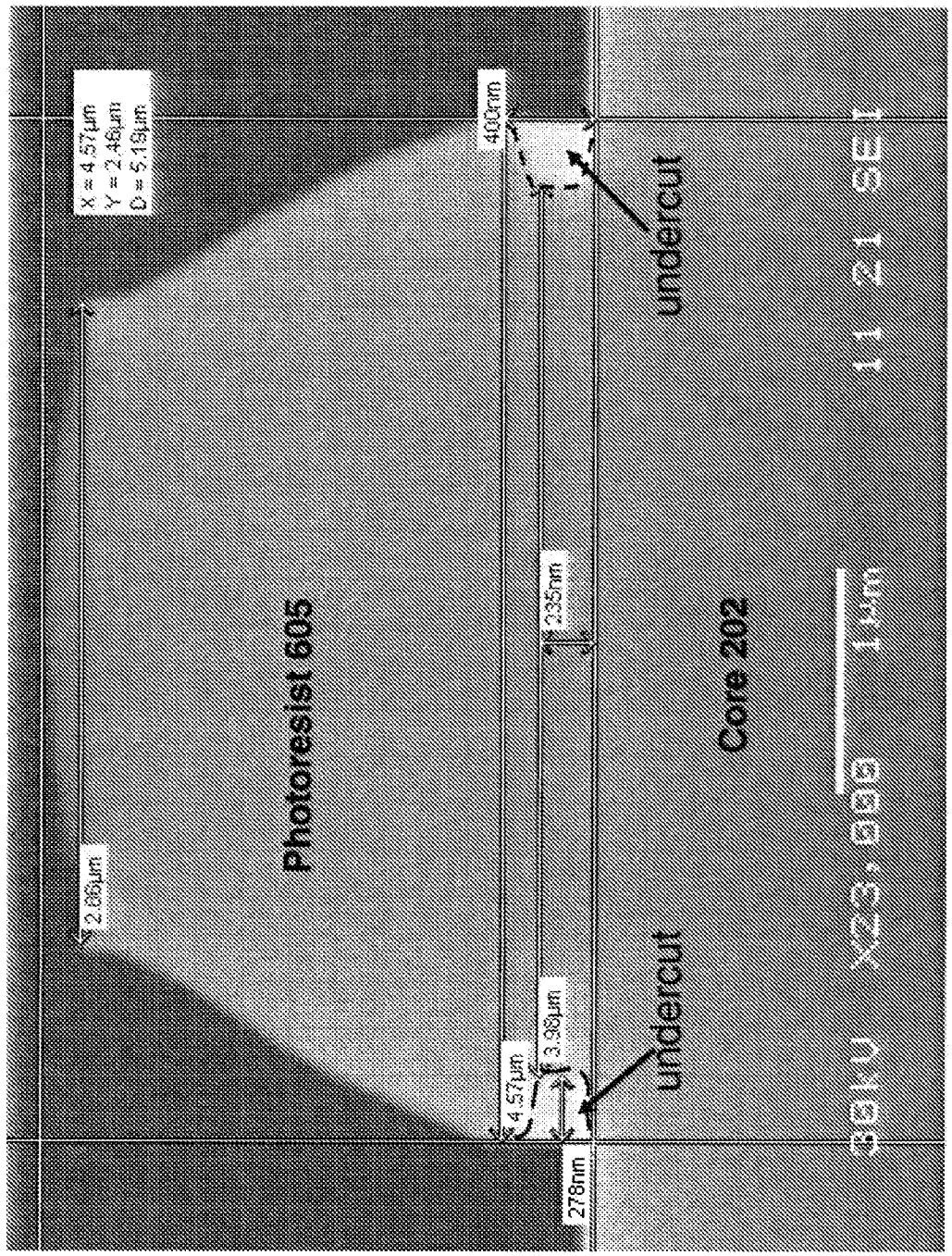
FIG. 7 is a SEM picture showing an undercut at a photoresist-BARC interface, according to an embodiment of the present invention.

FIG. 6B shows an alternative method of reducing the chances of formation of the parasitic gratings on waveguide sidewall. This method does not involve the use of a barrier layer 208. FIG. 6A shows an existing method, where a photoresist layer 605 is applied directly onto a core layer with an etched PBG. Due to the non-uniformity of the photoresist layer 605 that follows the grating topography, reflections from below the photoresist layer 605 may cause non-uniform exposure of the photoresist, and, as a result, parasitic gratings are created on waveguide sidewalls during RIE etching. To counter this problem, a layer 615 of bottom anti-reflective coating (BARC) material is deposited on the grating prior to applying the photoresist layer 605 that is used to pattern the top of the waveguide for subsequent RIE etching. This BARC layer 615 not only suppresses reflections from the corrugated grating surface, but also has a planarizing effect on the grating corrugations, leaving a relatively flat surface for the application of the photoresist 605. Note that in FIG. 6B, the grating corrugations are shown in an exaggerated manner for clarity, and the planarizing effect of the BARC layer is not shown to a real extent. The BARC pre-treatment comprises of a hard bake step, parameters of which can be tailored to control the BARC undercut at the BARC/photoresist interface 625 during the photoresist development cycle. FIG. 7 shown an SEM picture showing the undercut at the interface 625. Because of the undercut, the bottom angle edge of the photoresist is isolated from the grating corrugations, resulting in a reduction or elimination of the transfer of the primary grating structure into out-of-phase parasitic gratings on the waveguide sidewall during etch.

Figures 8A, 8B:
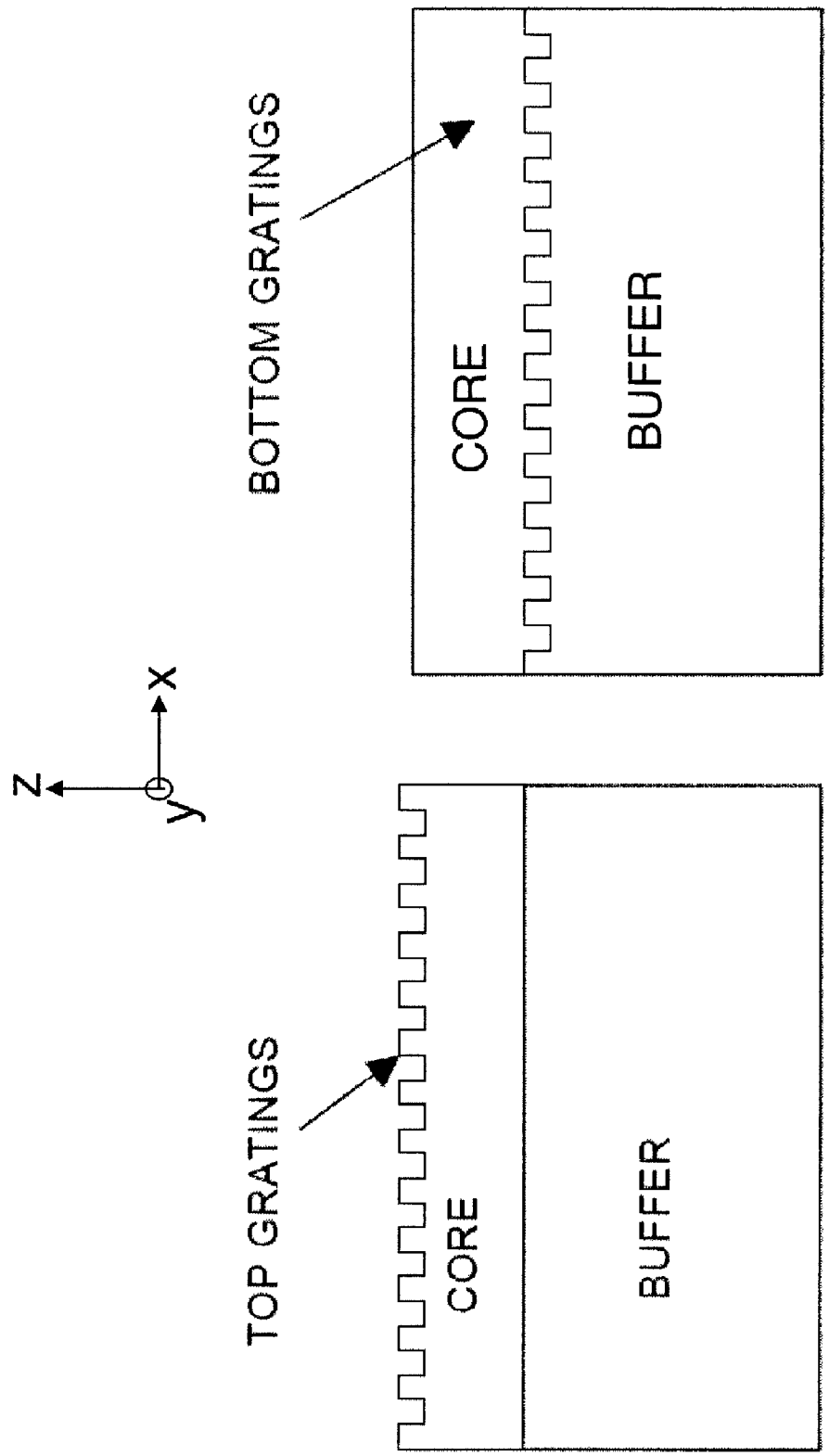
FIGS. 8A-B compare top PBG with bottom PBG, according to two different embodiments of the present invention.

Another approach of reducing reflections from the grating corrugations to the photoresist layer applied on the core layer for RIE etch is using bottom grating configuration rather than the traditional top-grating configuration. FIG. 8A shows a top grating configuration, and FIG. 8B shows a bottom grating configuration. Bottom gratings are etched into the buffer layer by holographic exposure of the buffer layer. Then the core layer is deposited. This configuration is less susceptible to multiple reflections coming from beneath the photoresist layer applied on top of the core layer, resulting in reduction or elimination of parasitic grating formation on the sidewalls. Persons skilled in the art will appreciate that bottom grating configuration can be used in the other example embodiments discussed above as an additional means for reducing parasitic grating effects.

The descriptions above are intended to be illustrative, not limiting. Thus, it will be apparent to one skilled in the art that modifications may be made to the invention as described without departing from the scope of the claims set out below.

What is claimed is:

1. A method for fabricating a planar lightwave circuit (PLC) device, the method comprising:
    selectively doping an area of a core layer with a dopant to define a core area of a waveguide;
    preparing Bragg grating corrugations on top of the core area across a predefined width of the waveguide;
    forming a barrier layer on top of the Bragg grating corrugations, wherein a material of the barrier layer is selected to prevent outdiffusion of the dopant into the barrier layer;
    lithographically patterning a top surface of the PLC device to cover the Bragg grating corrugations underneath during subsequent etching;
    etching through the barrier layer and through the core layer to expose waveguide sidewalls;
    encompassing the core area at least partially with a cladding material; and
    annealing the PLC device at a high temperature, allowing outdiffusion of the dopant from the core area into the cladding material, thereby smoothening the waveguide sidewalls.

2. The method of claim 1, wherein the core area comprises silica, and the dopant comprises germanium.

3. The method of claim 1, wherein the barrier layer comprises undoped silica.

4. The method of claim 3, wherein a thickness of the undoped silica barrier layer is approximately 1 micron.

5. The method of claim 1, wherein the forming the barrier layer comprises ensuring that the thickness of the barrier layer is sufficiently higher than a depth of the Bragg grating corrugations, such that overall the PLC device is substantially planar after the formation of the barrier layer and before the etching.

6. The method of claim 1, wherein the cladding material comprises borophotosilicate glass (BPSG) or silica.

7. The method of claim 1, wherein the core layer is formed on top of a buffer layer.

8. The method of claim 7, wherein the buffer layer comprises borophotosilicate glass (BPSG) or silica.

9. The method of claim 1, wherein the PLC includes a plurality of waveguides disposed side by side.

10. The method of claim 1, wherein undesired parasitic gratings are removed from the etched waveguide sidewalls when waveguide sidewalls are smoothened during the annealing step because of dopant outdiffusion.

11. The method of claim 1, wherein the barrier layer acts as a hard mask for subsequent etching step to expose waveguide sidewalls.

12. The method of claim 11, wherein a material of the barrier layer comprises a polysilicon or a metal when used as a hard mask.

13. The method of claim 11, wherein undesired parasitic gratings are prevented from being formed when waveguide sidewalls are exposed during the etching step.

14. The method of claim 1, wherein the core area comprises silica, the dopant comprises germanium, the barrier layer comprises undoped silica, and the cladding material comprises borophotosilicate glass (BPSG) or silica.

15. A method for fabricating a planar lightwave circuit (PLC) device, the method comprising:
    defining a core area in a core layer of a waveguide;
    preparing Bragg grating corrugations on top of the core area across a predefined width of the waveguide;
    forming a Bottom Anti Reflective Coating (BARC) layer on top of the Bragg grating corrugations, wherein the BARC layer substantially planarizes the Bragg grating corrugations;
    hard-baking the BARC layer, where parameters of the hard-baking step are controlled to tailor an undercut of a photoresist layer at an interface with the BARC layer during subsequent photolithography;
    photolithographically patterning a top surface of the PLC device to cover the Bragg grating corrugations with the photoresist layer and the BARC layer during subsequent etching;
    etching through the core layer to expose waveguide sidewalls, wherein undesired parasitic gratings are prevented from being formed during the etching step due to the undercut of the photoresist layer at the interface with the BARC layer.

16. The method of claim 15, wherein the BARC layer can be developed to create a desired pattern on top of the Bragg grating corrugations.

* * * * *